Feb. 17, 1942.　　M. JANES ET AL　　2,273,799
PROCESS FOR ELECTROLYTIC REDUCTION
Filed Dec. 17, 1938

INVENTORS
GEORGE W. HEISE
MILTON JANES
BY
ATTORNEY

Patented Feb. 17, 1942

2,273,799

UNITED STATES PATENT OFFICE 2,273,799

PROCESS FOR ELECTROLYTIC REDUCTION

Milton Janes, Lakewood, and George W. Heise, Rocky River, Ohio, assignors to National Carbon Company, Inc., a corporation of New York Application December 17, 1938, Serial No. 246,281

10 Claims. (Cl. 204—91)

The invention relates to electrolytic processes wherein an impressed electric current is passed through a cell having insoluble electrodes immersed in an aqueous electrolyte. More particularly, the invention is a process for electrolytically reducing water soluble reducible compounds at a cathode.

Although it will be apparent as the following description proceeds that the invention is applicable, with appropriate modification, to numerous processes of the above-defined type, for the sake of clarity and convenience the principles of the invention will be illustrated by specific reference to processes for reducing stannic salts, such as stannic chloride; alkaline metal nitrates; and alkaline metal bisulfites.

In its broad aspect, the invention contemplates the use of porous electrodes to achieve certain desirable objects, including some or all of the following:

(a) To decrease the voltage drop through, and the power consumption of the cell;

(b) To provide for the removal of a product from the cell, promptly upon its formation;

(c) To provide for the introduction and distribution of one or more materials, for instance reactants, into the cell at particularly effective places; and (d) To provide a convenient and appropriate situs for desired chemical reactions.

(e) To provide for a more ready and rapid access of reactant to an active electrode surface.

These and other objects are achieved in a process which utilizes a porous insoluble cathode and an anode which may be porous in some instances or solid in others, as will be explained.

Figure 1:
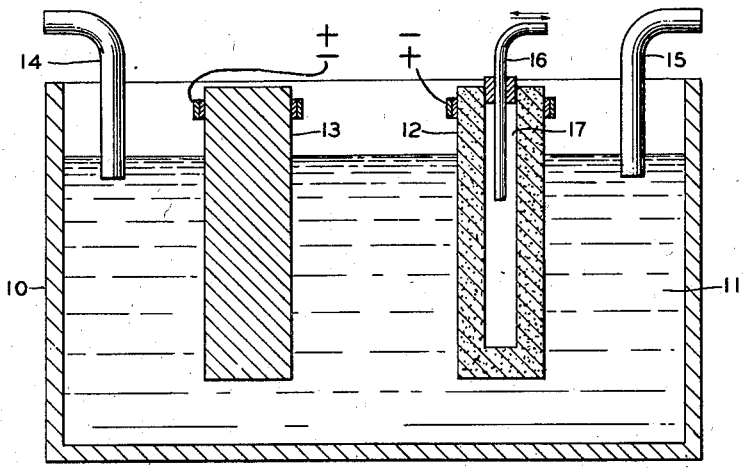
Figure 2:
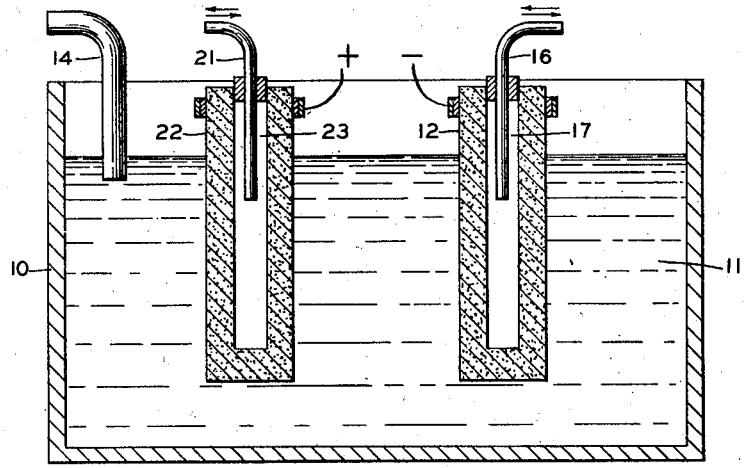

The invention will be described with reference to the attached drawing in which:

Fig. 1 represents diagrammatically in vertical cross-section an electrolytic cell container 10 containing an aqueous electrolyte 11 in which are immersed a porous cathode 12 and a nonporous anode 13, and Fig. 2 represents diagrammatically in vertical cross-section an electrolytic cell similar to that shown in Fig. 1 except that it contains two porous electrodes 12 and 22.

An aqueous solution of stannic chloride may be reduced at a cathode to stannous chloride, and this method has been used. In known processes, however, continuous operation is not feasible without the use of a diaphragm.

According to the present invention, and with particular reference to Fig. 1, stannic chloride may be reduced at a porous insoluble cathode 12 through which catholyte 11 containing the stannous chloride is continuously withdrawn. In this manner, continuous operation of the cell has been attained experimentally at current densities as high as 25 to 30 amperes per square foot of cathode superficial area and with current efficiencies in the neighborhood of 90%, utilizing a porous carbonaceous cathode, an electrolyte containing 73 grams of hydrochloric acid and 100 grams of $SnCl_4 \cdot 5H_2O$ per liter. No diaphragm need be used, and elimination of the diaphragm decreases the operating voltage of the cell.

In an analogous manner, a nitrate, such as sodium nitrate, may be reduced to nitrite in an alkaline medium at a porous cathode 12 through which electrolyte 11 containing the nitrite is continuously withdrawn. The operating voltage of the cell may be lowered, and the current efficiency and percentage conversion of nitrate to nitrite may be increased, by incorporating a suitable metallic catalyst, such as copper or silver, in the porous cathode. For instance, using an electrolyte containing 43 grams of sodium nitrate and 40 grams of sodium hydroxide per liter, and a current density of 14 amperes per square foot of superficial area of cathode, the following cell voltages, current efficiencies, and percentages of conversion of nitrate to nitrite at a porous carbonaceous cathode have been observed experimentally:

|  | Voltage | Efficiency | Conversion |
| --- | --- | --- | --- |
|  |  | Percent | Percent |
| Without catalyst | 3.0 | 20 | 4 |
| With Cu catalyst | 2.5 | 50 | 20 |
| With Ag catalyst | 2.1 | 85 | 85 |

No diaphragm need be used in this process.

A solution containing a soluble bisulfite, such as an alkaline metal bisulfite, with or without an alkaline metal sulfite, may likewise be electrolyzed in a cell similar to that shown in Fig. 1, the hyposulfite thereby formed at a porous cathode 12 being promptly withdrawn through that cathode. In this manner, a relatively highly concentrated product can be obtained continuously, even at high current densities. High current efficiencies and high percentage conversion to hyposulfite can be attained. No diaphragm is needed to prevent anodic reoxidation of the product; but under some conditions it may be desirable to use a diaphragm to minimize anodic oxidation of the original ingredients of the electrolyte 11.

A product containing 60 grams of sodium hyposulfite per liter has been obtained by using current densities of 46 to 92 amperes per square foot at a porous carbonaceous cathode, the current efficiencies in these instances being between 90% and 100%. In another instance, a product containing 132 grams of sodium bisulfite was obtained during operation at 7° C., with a cathode current density of 92 amperes per square foot and a current efficiency of 80%.

It may be desirable on occasion to use a cell as shown in Fig. 2, containing a porous cathode 12 and a porous anode 22. For instance, catholyte containing hyposulfite may be withdrawn continuously through the cathode 12, and anolyte may be withdrawn continuously or intermittently through the anode 22 to eliminate or to control the amount of anodically oxidized materials in the main body of the electrolyte 11. Alternatively, fresh electrolyte, for instance a sulfite or sulfite-bisulfite solution, may be introduced into the cell 10 through the porous anode 22, and in such instance the acid formed by oxidation at the anode will pass to the cathode where it is used in the production of hyposulfite according to the reaction:

$$Na_2SO_3 + 2NaHSO_3 = Na_2S_2O_4 + Na_2SO_4 + H_2O$$

In general, it is preferred to pass the reactant, or product, as the case may be, through the porous electrode at at least the rate required to supply, or remove, the material in question as rapidly as it is needed, or formed, at the active electrode surface. In many instances it will be advantageous to exceed such rate.

Although various porous materials may be used as the cathode material, we prefer to use a carbonaceous material having a porosity above 35% (preferably between 40% and 70%), calculated as follows: % porosity=100 (real density—apparent density)÷real density. Further, the electrode material should have an air permeability above 15, and preferably above 30. Whenever used herein and in the appended claims, the term "air permeability" means the number of cubic inches of air per minute passing through one square inch cross-section of electrode material, when air at a presure of one pound per square inch is blown through a block of the material one inch thick. The following table shows, for purposes of comparison, the porosity and permeability of ordinary electrode carbons (types 1, 2 and 3) and of the special electrode carbons included in this invention (types 4, 5, 6, and 7).

| Type | Porosity | Air permeability |
|---|---|---|
| | Percent | |
| 1 | 25 | 2 |
| 2 | 28 | 7 |
| 3 | 33 | 2 |
| 4 | 60 | 20 |
| 5 | 57 | 30 |
| 6 | 40 | 120 |
| 7 | 42 | 600 |

We have also found that the pores of the electrode material should be relatively minute and uniformly distributed, and not large, scattered voids and fissures. Material having the latter kind of pores might be described as "leaky" rather than "porous." The relative uniformity of distribution of the pores in the two kinds of materials may be distinguished by a simple test: if air is forced through a thin block of the material under water, at about the minimum air pressure required to obtain bubbles in the water, the "porous" material gives forth a cloud of small bubbles over its entire surface, while the "leaky" material gives a number of separate streams of bubbles issuing from the larger fissures and voids.

Another test for uniformity of porosity of these materials comprises determining the flow of a viscous liquid, such as a concentrated aqueous solution of cane sugar, under a moderate pressure, for instance a head of about six inches, through a thin (e. g. one-eighth inch) section of the material. Any relatively large fissures permit flow of the solution and are thereby made evident.

Porous electrode material within this invention may be made from comminuted solid carbonaceous material (for example, coke, graphite, or charcoal) and a porous carbonaceous binder (for instance, baked tar or pitch). Suitable methods for making such electrode material are described in U. S. Patent 1,988,478, issued on January 22, 1935, to B. E. Broadwell and L. C. Werking.

In some processes the kind of solid carbon chosen for the electrode material will make little or no difference; in other processes it will be desirable or necesary to take advantage of the fact that graphite has a higher oxygen overvoltage than coke, and that coke has a higher oxygen overvoltage than charcoal. Otherwise stated, in a given instance either a high or a low overvoltage may be influential, and the overvoltage characteristics may be accordingly controlled by a proper choice of electrode material.

Other embodiments of the invention are contemplated by us. For instance, polarization at either or both of the electrodes, which increases the resistance and opposes the flow of electric current, may be diminished by passing a fluid, which may be either a liquid or a gas, through the porous electrode into the cell or by withdrawing electrolyte containing a depolarizer from the cell through the porous electrodes, thereby decreasing the concentration of material next to the electrode.

Although several specific processes have herein been described in detail, it will readily be understood that these descriptions are presented only by way of examples illustrating certain aspects of the invention, and that the invention is not limited to or by such examples. Furthermore, although one shape of electrode is shown in the attached drawing as an example, the invention is not limited to that or any other specific shape. For instance, under some circumstances it may be desired to provide non-porous portions in the electrode, or to adopt a special shape, in order to regulate the distribution of fluid flowing through the electrode, or for another reason. It may also be advantageous to place a porous electrode or electrodes, not provided with a central well 17 or 23, at the end or ends of the cell container 10 in such a manner that a space is left between the electrode and the container, which space may be used to serve the functions of the central well 17 or 23 described herein.

We claim:

1. Method of reducing a water soluble inorganic salt of an element of variable valency in a high valency state to a salt of such element in a lower valency state which comprises electrolyzing an aqueous solution of said salt in an electrolytic cell containing an anode and a porous carbon cathode composed of comminuted solid carbon in a uniformly finely porous binder, said cathode having a porosity between 35% and 70% and an air permeability above 15, whereby the salt is reduced at the cathode, and withdrawing through the pores of said cathode catholyte containing the reduced salt, such withdrawal being prompt, whereby only partial reduction of the valency of said element takes place.

2. Method of reducing a water soluble stannic salt which comprises electrolyzing an aqueous solution of said stannic salt in an electrolytic cell containing an anode and a porous carbonaceous cathode having a porosity between 35% and 70% and an air permeability above 15, and consisting of comminuted solid carbon in a porous carbon binder, whereby stannic salt is reduced to stannous salt, and withdrawing through the pores of said cathode catholyte containing said stannous salt.

3. Method of reducing stannic chloride to stannous chloride which comprises passing an electric current through an electrolyte, containing stannic chloride, between an anode and a porous cathode, said cathode having a porosity between 40% and 70% and an air permeability above 30 and comprising comminuted solid carbonaceous material and a uniformly porous carbonaceous binder, whereby stannic chloride is reduced to stannous chloride at said cathode, and continuously withdrawing through the pores of said cathode catholyte containing said stannous chloride.

4. Method of producing a water soluble inorganic nitrite from a water soluble inorganic nitrate which comprises passing an electric current through an aqueous electrolyte, containing said water soluble nitrate, between an anode and a porous cathode having a porosity between 35% and 70% and an air permeability above 15 and consisting of comminuted solid carbon in a porous carbon binder, whereby nitrate is reduced to nitrite at the cathode, and withdrawing through the pores of said cathode catholyte containing said nitrite.

5. Method of reducing an alkaline metal inorganic nitrate to alkaline metal nitrite which comprises passing an electric current through an electrolyte, containing alkaline metal nitrate, between an anode and a porous cathode, said cathode having a porosity between 40% and 70% and air permeability above 30 and comprising a metallic catalyst, comminuted solid carbonaceous material, and a uniformly porous carbonaceous binder, whereby said nitrate is reduced to nitrite, and continuously withdrawing through the pores of said cathode catholyte containing said nitrite.

6. Method of producing a water soluble hyposulfite which comprises passing an electric current through an aqueous electrolyte, containing a soluble bisulfite, between an anode and a porous cathode having a porosity between 35% and 70% and an air permeability above 15 and composed of comminuted solid carbon in a porous carbon binder, whereby the bisulfite is reduced to hyposulfite at the cathode, and passing through the pores of said cathode electrolyte containing said hyposulfite.

7. Method of producing sodium hyposulfite which comprises passing an electric current through an aqueous electrolyte, containing sodium bisulfite, between an anode and a porous cathode, said cathode having a porosity above 35% and an air permeability above 15 and comprising comminuted solid carbonaceous material and a porous carbonaceous binder having uniformly distributed pores, whereby sodium bisulfite is reduced at said cathode to hyposulfite, and continuously withdrawing through the pores of said cathode catholyte containing said hyposulfite.

8. Method of producing sodium hyposulfite which comprises passing an electric current through an aqueous electrolyte, containing sodium bisulfite and sodium sulfite, between a porous anode and a porous cathode, whereby sodium hyposulfite is produced at the cathode, continually withdrawing catholyte containing said hyposulfite through the porous cathode, and passing electrolyte through the pores of the porous anode, said porous cathode having a porosity between 35% and 70% and an air permeability above 30 and comprising comminuted solid carbon in a porous carbon binder having uniformly distributed pores.

9. Method of producing sodium hyposulfite in an electrolytic cell, which comprises passing an electric current through an aqueous electrolyte, containing sodium bisulfite, between a porous anode and a porous cathode, whereby sodium hyposulfite is produced at the cathode; continuously supplying to said cell through said anode an aqueous electrolyte containing sodium bisulfite and sodium sulfite; and withdrawing through the pores of the porous cathode catholyte containing said sodium hyposulfite.

10. Method as defined in claim 9, wherein the anode has a porosity between 40% and 70% and an air permeability above 30 and comprises comminuted solid carbonaceous material and a porous carbonaceous binder having uniformly distributed pores.

MILTON JANES.
GEORGE W. HEISE.

CERTIFICATE OF CORRECTION.

Patent No. 2,273,799. February 17, 1942.

MILTON JANES, ET AL.

It is hereby certified that error appears in the printed specification of the above numbered patent requiring correction as follows: Page 3, second column, line 51, claim 9, after the word "hyposulfite" and before the period insert --, said porous cathode having a porosity between 35% and 70% and an air permeability above 30 and comprising comminuted solid carbon in a porous carbon binder having uniformly distributed pores--; and that the said Letters Patent should be read with this correction therein that the same may conform to the record of the case in the Patent Office.

Signed and sealed this 21st day of April, A. D. 1942.

(Seal)

Henry Van Arsdale,
Acting Commissioner of Patents.